Dec. 18, 1923.  
M. L. KAPLAN  
ELECTRIC BATTERY LAMP  
Filed Feb. 16, 1922  
1,477,878
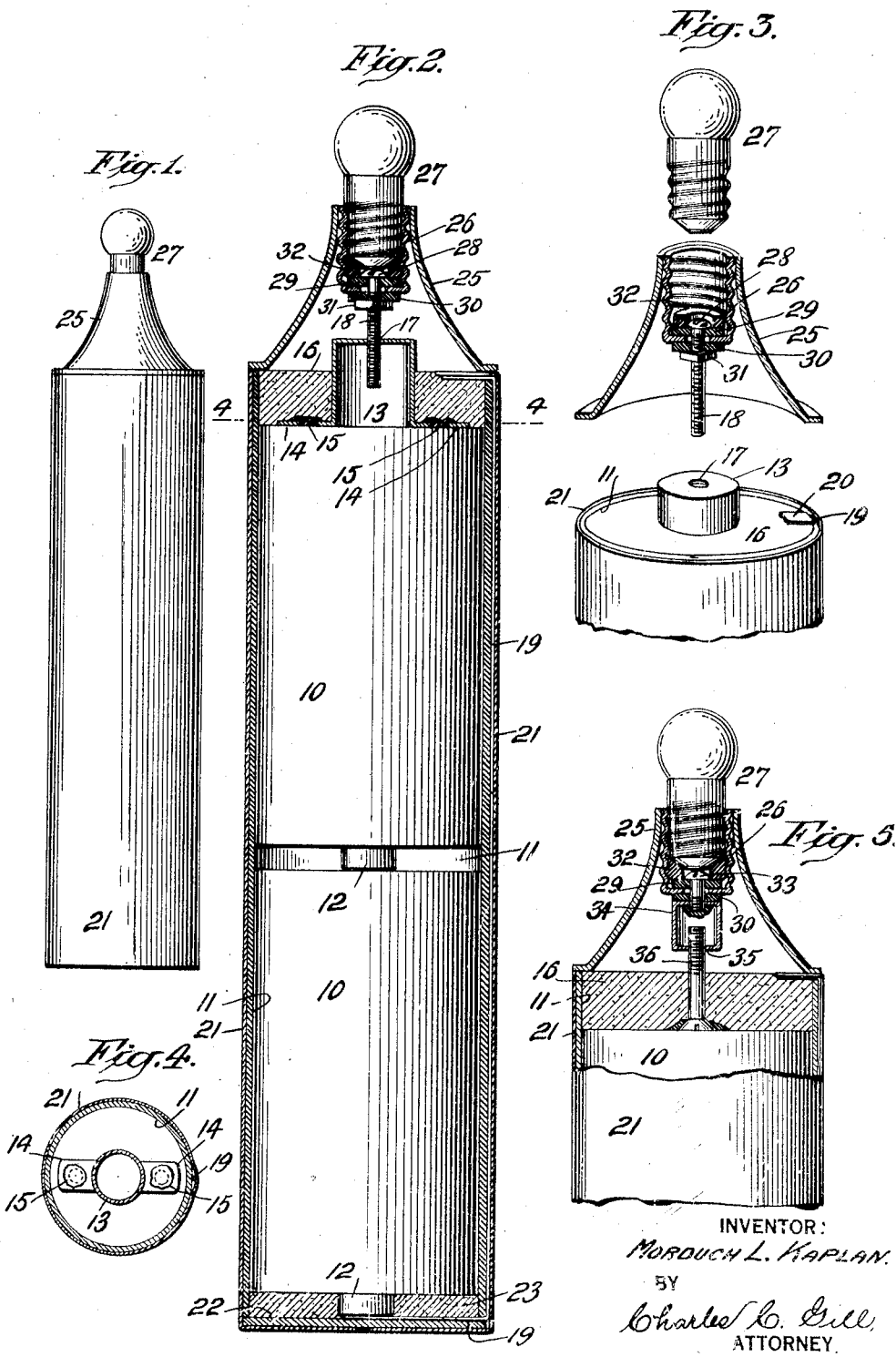
INVENTOR:
MORDUCH L. KAPLAN.
BY
Charles C. Gill
ATTORNEY.

Patented Dec. 18, 1923.

1,477,878

UNITED STATES PATENT OFFICE.

MORDUCH L. KAPLAN, OF BROOKLYN, NEW YORK.

ELECTRIC BATTERY LAMP.

Application filed February 16, 1922. Serial No. 536,859.

*To all whom it may concern:*

Be it known that I, MORDUCH L. KAPLAN, a citizen of the United States, and a resident of Brooklyn, in the county of Kings and State of New York, have invented certain new and useful Improvements in Electric Battery Lamps, of which the following is a specification.

The invention pertains more particularly to electric battery lamps possessing a battery and a miniature electric lamp bulb and adapted to stand on a table or the like.

One object of my invention is to produce a novel, efficient and comparatively inexpensive candle lamp.

The battery lamp of my present invention preferably comprises a plural cell battery of novel arrangement in that the positive pole or element of the lower cell thereof is disposed at the lower end of the battery and that the negative pole or element of the upper cell is at the upper end of the battery, a cap or dome detachably applied on the upper end of the battery and detachably receiving a miniature electric lamp bulb in a manner adapting the same for connection with the negative pole of the battery through the means securing the cap or dome in position, a conductor extending from the positive pole of the lower cell of the battery to a position at the upper end of the battery for electrical connection with said cap or dome and an enclosing carton for the battery and its features, upon the outer surface of which carton will preferably be applied a covering of paper or other material affording a suitable finish for a candle lamp. The circuit through the lamp and battery may be made or broken by employing the lamp bulb as a switch or by employing the dome as a switch. The circuit through the lamp and battery may also be made and broken in other ways, as by the employment of a manually operative switch of any suitable character.

In carrying out my invention in the preferred embodiment thereof, I provide the cap or dome with a conducting and securing screw in position to be engaged at one end by the lower terminal of the lamp bulb and to become connected at its other end with the negative element of the battery, said screw being employed for securing the cap or dome on the battery, and as means for affording a connection for the said screw, I secure upon the upper negative end of the upper cell of the battery a hollow cap apertured to receive the screw. I may, however, reverse this construction and connect the hollow cap with the conductor for the lamp bulb and secure the screw upon the upper negative end of the upper cell of the battery. The conductor extending from the positive pole of the lower cell of the battery is preferably bent over upon a filling of non-conducting material applied upon the negative end of the upper cell of the battery, so that said conductor may be normally insulated from the negative pole of the battery. One very desirable feature of my invention resides in the provision of an elastic seat for the annular edges of the lower end of the lamp bulb, this seat being in the form of a rubber ring surrounding the contact to be engaged by the lower terminal of the lamp bulb and the advantages thereof being hereinafter explained.

The invention will be fully understood from the detailed description hereinafter presented, reference being had to the accompanying drawings, in which:

Fig. 1 is a side elevation of an electric candle lamp embodying my invention;

Fig. 2 is a vertical section, on a larger scale, through the same;

Fig. 3 is a perspective view, partly in section, of the upper end portion of the battery, the cap or dome to be applied thereto and the lamp bulb for introduction into said cap, the several parts being shown in relation to be assembled and produce the construction shown at the upper end of Fig. 2;

Fig. 4 is a horizontal section through the upper portion of the candle lamp, taken on the dotted line 4—4 of Fig. 2, and Fig. 5 is a sectional view, partly in side elevation and partly broken away, of a candle lamp embodying a modified form of my invention.

In the drawings, referring to Figs. 1 to 4 inclusive, illustrating one embodiment of my invention, 10 designates the cells of the battery, one cell being placed above another in series in the formation of a plural cell battery, and said cells in the completion of the battery are enclosed in a paste-board carton or the like 11 which insulates and keeps the cells together and permits them to be handled as a unit. The cells 10 contrary to the usual method of forming a plural cell battery have their positive elements 12 projected downwardly, the positive pole of one cell being thus placed against the negative pole or zinc of the adjacent lower cell.

Upon the upper end of the upper cell 10 and in electrical connection with the negative element thereof, I secure a hollow cap or nut 13 preferably having perforated base-wings 14 by means of which, with the aid of solder 15, I secure the cap 13 upon the zinc end of the upper cell 10. The pasteboard carton or cylinder 11 extends above the upper cell 10 and thereby forms an annular pocket around the cap 13, and within the space thus formed apply a filling or layer of insulating material 16, the same being applied while soft and allowed to harden. I have usually employed sealing wax for the layer 16, but other materials of suitable or like nature may be substituted therefor. The cap 13 projects upwardly on the central plane of the battery and is formed in its top with an opening 17 to receive and engage the thread of a screw conductor 18 hereinafter described.

A conducting wire or strip 19 is secured to the positive element 12 of the lower cell 10 and thence extends laterally through a recess in the side of the carton or cylinder 11, whence said strip extends upwardly along the outer side of said carton and is bent inwardly over the upper edge thereof, the upper end of the wire preferably having a flat contact member 20 secured thereto or formed thereon and said member 20 lying upon the insulating layer 16 and being free of the cap 13, whereby said member 20 becomes insulated from the negative element of the battery.

Upon the outside of the carton or cylinder 11 and concealing the conductor 19, I apply a wrapping of paper or other suitable material 21 which may be of ornamental character and add a finish to the candle lamp, and said wrapper material will preferably extend below the bottom of the battery, as shown in Fig. 2. I preferably interpose a paste-board disk 22 below the positive element 12 of the lower cell and below that portion of the conductor 19 adjacent thereto, and I also preferably apply upon the lower end of the lower cell a filling 23 of sealing wax or the like, covering said end of the cell 10 and surrounding the positive element 12 of said cell, the disk 22 and filling layer 23 serving to afford a substanital base for the candle lamp.

The main cap or dome for the candle lamp is numbered 25 and is preferably of approximately cone outline and flared outwardly at its base portion to imitate in outline the upper end of a wax candle and also to cover over and conceal the upper end of the battery. The cap or dome 25 will be formed wholly or in part of metal or other conductive material, and within its open apex said cap or dome is provided with a concealed threaded metal sleeve or socket 26 adapted to detachably receive a miniature electric lamp bulb 27 of usual type, one of whose terminals becomes placed in electrical connection with the cap or dome 25 by said sleeve. The lower end of the sleeve or socket 26 is flanged inwardly, as shown in Fig. 2, to form a bottom for the socket having a central vertical opening or hole therein. I secure to the bottom of the sleeve or socket 26 the metal screw 18 hereinbefore referred to, whose head 28 is within the sleeve or socket 26 and positioned to be engaged by the lower terminal of the lamp bulb 27 upon the application of said bulb to operative position within said sleeve or socket. The screw 18 is insulated from the sleeve or socket 26 by means of a washer 29 of insulating material upon which the head 28 bears and by means of a corresponding washer 30 on said screw and bearing against the lower exterior end of the sleeve or socket 26 and also from the fact that the hole in the bottom of the sleeve or socket 26 is greater in diameter than said screw, whereby the screw becomes spaced from said bottom, as shown in Fig. 2. Upon the screw 18 I apply a nut 31 which engages the washer 30 and serves with the head 28 and interposed washers 29, 30 to bind the screw 18 firmly in position centrally and to the bottom of the sleeve or socket 26. The screw 18 is carried by the cap or dome 25 and utilized as a conductor and also as means for detachably connecting said cap or dome with the metal cap 13 secured upon the negative element of the upper cell 10. The threaded screw or stem 18 projects downwardly centrally of the dome or cap 25, and in the application of said cap or dome to the battery, the lower portion of said screw or stem is screwed into the hole 17 in the top of the cap 13, said screw engaging with thread effect said cap 13. I have not found it to be necessary to tap the hole 17, since the cap 13 is of thin metal and the screw or stem 18 will form its own engaging flange or thread at the edge of said hole. If preferred, however, the hole 17 may be tapped to provide a thread to be engaged by the thread on the screw or stem 18.

Within the lower portion of the sleeve or socket 26 and resting upon the insulating washer 29, is a ring seat 32 of rubber or other yielding material, this ring being open at its center to permit the lower terminal of the lamp bulb to contact with the head 28 of the screw or stem 18 and serving as a seat for the lower end surfaces of the lamp bulb exterior to said terminal. I regard the annular seat 32 for the lamp bulb as of special importance in securing and maintaining a proper electrical connection between the lamp bulb and the conductor 18. There is always a looseness in the threads between the lamp bulb 27 and the socket 26 and this looseness is taken up and a binding fit of the lamp bulb within the socket secured when the yielding seat 32 is made use of. When the lamp bulb is screwed downwardly into the socket 26, in the absence of the yielding seat 32, the lower terminal of the lamp will engage the head 28 of the screw or stem 18 and complete the circuit, but since there is then a more or less loose connection between the lamp bulb and the sleeve, the circuit becomes uncertain and subject to be readily broken by any jarring of the lamp. When the yielding seat 32 is provided, the lower end of the lamp bulb meets and compresses the same before the lower terminal of the bulb passes into engagement with the head 28 on the conductor 18, and the resistance offered by said seat to the downward movement of the lamp bulb acts to bind the thread on the lamp bulb upwardly against the thread on the socket 26 and creates a tightness of the parts which preserves the contact of the lower lamp terminal with the conductor 18 and thus maintains the continuity of the circuit while the candle lamp is standing at rest and also when the lamp is moved about and subjected to jarring action.

It will be plain, without extended explanation, that should the lamp bulb be screwed home in the socket 26 and the dome screwed down over the battery until the lower edge thereof engages the contact 20, the circuit will be made from the positive element through the conductor 19, dome 25 and socket 26 to one terminal of the lamp bulb and from the other terminal of the lamp bulb through the conductor 18 and cap 13 to the negative element of the battery. The cap or dome may be applied to the battery and thereafter receive the lamp bulb, as is obvious. The circuit may be made and broken by using the lamp bulb as a make and break switch, or the lamp bulb may be allowed to remain against the conductor 18 and the circuit made and broken by screwing the dome downwardly against the contact 20 or upwardly therefrom, the dome then being used as a make and break switch. I preferably employ the bulb as a means for making and breaking the circuit.

In the modification of my invention shown in Fig. 5 the screw which connects the dome with the battery is secured to the negative element of the upper cell instead of being carried by the dome, this being mainly a reversal of parts. In the construction shown in Fig. 5, I extend a short contact screw 33 through the washers 29, 30 and bottom of the sleeve or socket and thereon secure a hollow cap or nut 34, instead of the solid nut 31 of Fig. 2, having a hole 35 in its lower end to screw upon a stationary conducting screw or stem 36 extending upwardly from the negative element of the upper cell 10 and partly embedded in the covering layer of wax 16. The screw 36 and hollow nut or cap 34 serve as substitutes for the cap or nut 13 and screw 18 of Fig. 2. The construction shown in Fig. 5 has the same operation as that shown in Figs. 1 to 4 inclusive, and Fig. 5 is presented to indicate that my invention is not in every instance limited to the details of form and arrangement of parts illustrated in Fig. 2.

What I claim as my invention and desire to secure by Letters-Patent, is:

1. An electric battery lamp of the character described, comprising a plural cell battery adapted to stand on end and the positive pole elements of whose cells extend downwardly, a carton enclosing said cells, a conductor affording a central attaching means secured upon the negative upper end of the upper cell, a conductor connected with the positive pole of the lower cell and extending upwardly along one side of the battery to the upper portion thereof, a cap or dome of conducting material superimposed over the upper end of said battery and having central conducting means insulated therefrom adapted to engage said central attaching means for detachably securing said cap or dome in position, and an electric lamp bulb detachably socketed in said cap or dome with one terminal in electrical connection therewith and its other terminal adapted for connection with the negative upper end of said upper cell through said central conducting securing means and said central attaching means, said cap or dome being adapted for electrical connection with the upper portion of the positive pole conductor.

2. An electric battery lamp of the character described, comprising a plural cell battery adapted to stand on end and the positive pole elements of whose cells extend downwardly, a carton enclosing said cells and extending above the same to afford a chamber for a non-conducting filler, a conductor affording a central attaching means secured upon the negative upper end of the upper cell of the battery, a non-conducting filler in said chamber embedding the lower portion of said conductor and concealing the said negative end of the upper cell, a conductor connected with the positive pole of the lower cell of the battery and extending upwardly along one side of the battery to the upper portion thereof, a cap or dome of conducting material superimposed over the upper end of said battery and having central conducting means insulated therefrom adapted to engage said central attaching means for detachably securing said cap or dome in position, and an electric lamp bulb detachably socketed in said cap or dome with one terminal in electrical connection therewith and its other terminal adapted for connection with the negative upper end of said upper cell through said central conducting securing means and said central attaching means, said cap or dome being adapted for electrical connection with the upper portion of the positive pole conductor.

3. An electric battery lamp of the character described, comprising a plural cell battery adapted to stand on end and the positive pole elements of whose cells extend downwardly, a carton enclosing said cells, a conductor affording a central attaching means secured upon the negative upper end of the upper cell, a conductor connected with the positive pole of the lower cell and extending upwardly along one side of the battery to the upper portion thereof, a cap or dome of conducting material superimposed over the upper end of said battery and having central conducting means insulated therefrom adapted to engage said central attaching means for detachably securing said cap or dome in position, and an electric lamp bulb detachably socketed in said cap or dome with one terminal in electrical connection therewith and its other terminal adapted for connection with the negative upper end of said upper cell through said central conducting securing means and said central attaching means, said cap or dome being adapted for electrical connection with the upper portion of the positive pole conductor, and said attaching means and said central securing means comprising a nut on one part and a threaded screw on the other part permitting said cap or dome to be screwed downwardly to position over the battery.

4. An electric battery lamp of the character described, comprising a plural cell battery adapted to stand on end and the positive pole elements of whose cells extend downwardly, a carton enclosing said cells, a conductor affording a central attaching means secured upon the negative upper end of the upper cell, a conductor connected with the positive pole of the lower cell and extending upwardly along the outer side of said carton and exposed at the upper end of the battery, a filling of non-conducting material substantially embedding the sides of the positive pole of said lower cell to leave a flat surface at the lower end of the battery, an exterior covering for said carton, upwardly extending conductor and lower end of the battery, a cap or dome of conducting material superimposed over the upper end of said battery and having central conducting means insulated therefrom adapted to engage said central attaching means for detachably securing said cap or dome in position, and an electric lamp bulb detachably socketed in said cap or dome with one terminal in electrical connection therewith and its other terminal adapted for connection with the negative upper end of said upper cell through said central conducting securing means and said central attaching means, said cap or dome being adapted for electrical connection with the upper portion of the positive pole conductor.

5. An electric battery lamp of the character described, comprising a plural cell battery adapted to stand on end and the positive pole elements of whose cells extend downwardly, a conducting nut secured upon the negative upper end of the upper cell and affording central attaching means, a conductor connected with the positive pole of the lower cell and extending upwardly along one side of the battery to the upper portion thereof, a superimposed cap or dome of conducting material over the battery having a central depending conducting screw insulated therefrom and adapted to said nut for detachably holding said cap or dome in position, and an electric lamp bulb detachably socketed in said cap or dome with one terminal in electrical connection therewith and its other terminal adapted for connection with the negative upper end of the upper cell through said screw and nut, said cap or dome being adapted for electrical connection with the upper portion of the positive pole conductor.

6. An electric battery lamp of the character described, comprising a battery adapted to stand on end, a conductive cap or dome superimposed over and detachably connected with the upper end of said battery and having therein a central threaded socket, a conductor secured in said socket and in electrical connection with one pole of the battery, a yielding seat of insulating material in the base of said socket surrounding said conductor and normally extending above the same, an electric lamp bulb adapted to said socket and having one terminal in electrical connection therewith and adapted at its lower annular edges to engage said yielding seat, said lamp bulb when screwed home being adapted to compress said seat and carry its lower terminal into engagement with said conductor, and means for connecting the other pole of the battery with said cap or dome.

7. An electric battery lamp of the character described, comprising a battery adapted to stand on end, a conductive cap or dome superimposed over and detachably connected with the upper end of said battery and having therein a central threaded socket, a conductor secured in said socket and in electrical connection with one pole of the battery, a yielding seat of insulating material in the base of said socket surrounding said conductor and normally extending above the same, an electric lamp bulb adapted to said socket and having one terminal in electrical connection therewith and adapted at its lower annular edges to engage said yielding seat, said lamp bulb when screwed home being adapted to compress said seat and carry its lower terminal into engagement with said conductor, and a conductor extending upwardly from the opposite pole of the battery to the upper end thereof for electrical connection with said cap or dome.

8. An electric battery lamp of the character described, comprising a battery adapted to stand on end, a conductive cap or dome detachably mounted over the upper end of the battery and having therein a threaded socket whose lower end is flanged inwardly to form a support and contains a central opening, a yielding seat of insulating material on said support and surrounding said opening, an electric lamp bulb adapted to said socket and having one terminal in electrical connection therewith and adapted at its lower annular edges to engage said seat, said lamp bulb when screwed home being adapted to compress said seat and position its lower terminal in electrical connection with one pole of the battery, and means for connecting the other pole of the battery with said cap or dome.

9. An electric battery lamp of the character described, comprising a plural cell battery adapted to stand on end, a conical conductive cap or dome superimposed over and detachably connected with the upper end of the same and having in its apex a central threaded socket whose lower end is flanged inwardly to form a support and contains a central opening, a yielding seat of insulating material on said support and surrounding said opening, an electric lamp adapted below its glass bulb to said socket and having one terminal in electrical connection therewith and adapted at its lower annular edges to engage said seat, said glass bulb being exposed at and above the apex of said conical cap and said lamp when screwed home being adapted to compress said seat and position its lower terminal in electrical connection with one pole of the battery, and means for connecting the other pole of the battery with said cap or dome.

10. An electric battery lamp of the character described, comprising a plural cell battery adapted to stand on end and the positive pole elements of whose cells extend downwardly, a carton enclosing said cells, a conductor affording a central attaching means secured upon the negative upper end of the upper cell, a conductor connected with the positive pole of the lower cell and extending upwardly along one side of the battery to the upper portion thereof, a cap or dome superimposed over the upper end of said battery and having central conducting means insulated therefrom adapted to engage said central attaching means for detachably securing said cap or dome in position, and an electric lamp bulb detachably socketed in said cap or dome with one terminal in electrical connection with the socket therefor and its other terminal adapted for connection with the negative upper end of said upper cell through said central conducting securing means and said central attaching means, the socket for the lamp being adapted for electrical connection with the upper portion of the positive pole conductor.

Signed at New York city, in the county of New York and State of New York, this 14th day of February, A. D. 1922.

MORDUCH L. KAPLAN.